US006369706B1

(12) United States Patent
Anderson et al.

(10) Patent No.: US 6,369,706 B1
(45) Date of Patent: Apr. 9, 2002

(54) SYSTEM AND METHOD FOR PROTECTING A DIGITAL INFORMATION APPLIANCE FROM ENVIRONMENTAL INFLUENCES

(75) Inventors: Glen J. Anderson, Sioux City, IA (US); Anthony M. Grasso, Dakota Dunes, SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/455,279

(22) Filed: Dec. 6, 1999

Related U.S. Application Data

(63) Continuation-in-part of application No. 09/310,164, filed on May 10, 1999, now abandoned.

(51) Int. Cl.[7] .............................................. G08B 19/00
(52) U.S. Cl. ...................... 340/521; 713/300; 713/323; 340/506; 340/825.06

(58) Field of Search ................................. 713/300, 323; 702/132; 714/24; 340/584, 602, 636, 825.01, 506, 588, 870.17, 825.06, 521; 379/39

(56) References Cited

U.S. PATENT DOCUMENTS

| 4,823,290 A | | 4/1989 | Fasack et al. ............... 364/550 |
|---|---|---|---|
| 5,230,055 A | * | 7/1993 | Katz et al. .................. 395/750 |

* cited by examiner

Primary Examiner—Daryl Pope
(74) Attorney, Agent, or Firm—Kenneth J. Cool; William J. Breen, III; Suiter & Associates PC

(57) ABSTRACT

The present invention is directed to a system and method for protecting a digital information appliance from an environmental influence. The digital information appliance is capable of detecting an environmental influence and determining if the detected environmental influence is potentially harmful. If the detected environmental influence is potentially harmful, the digital information appliance is capable of protecting the digital information appliance.

73 Claims, 14 Drawing Sheets

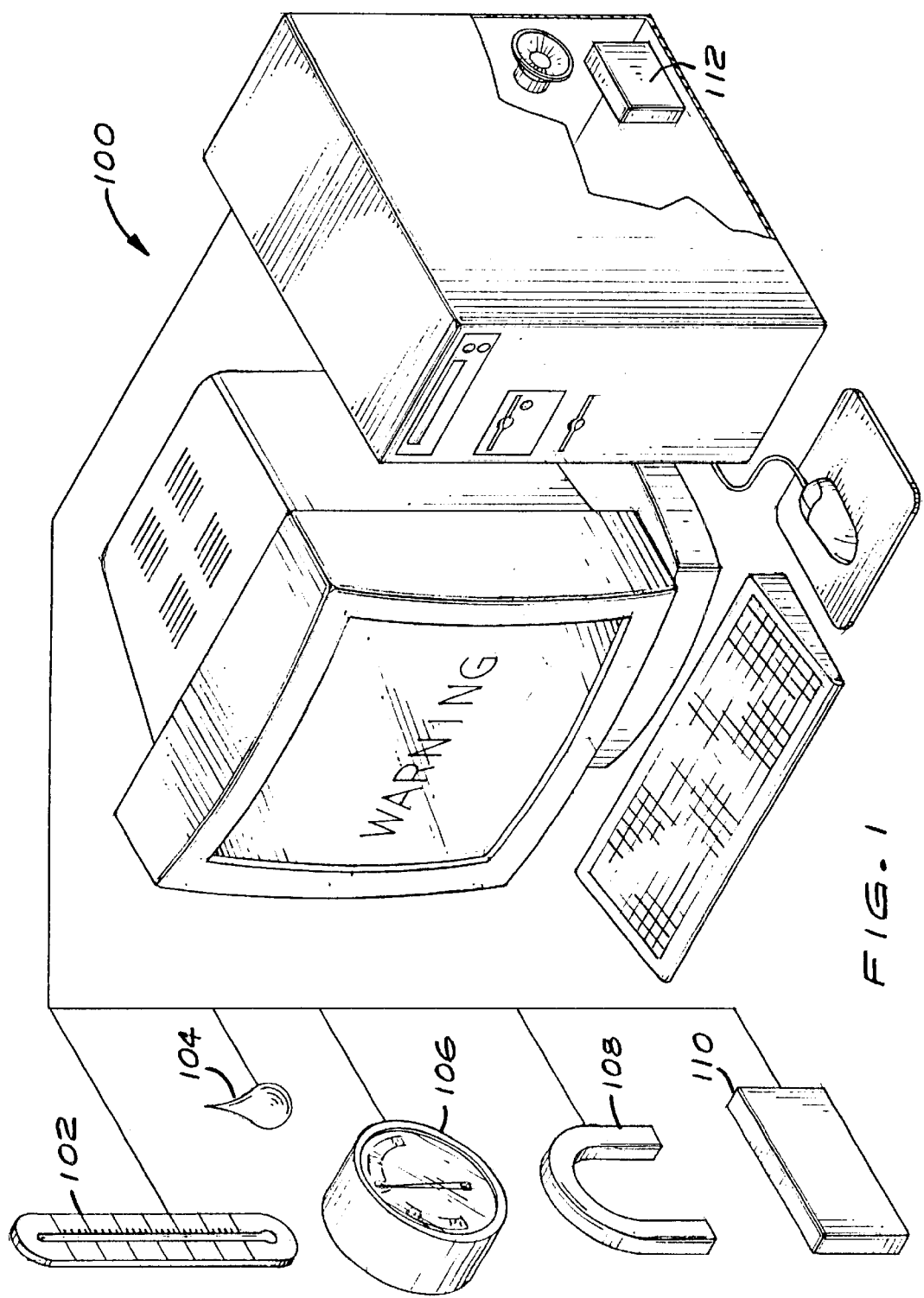

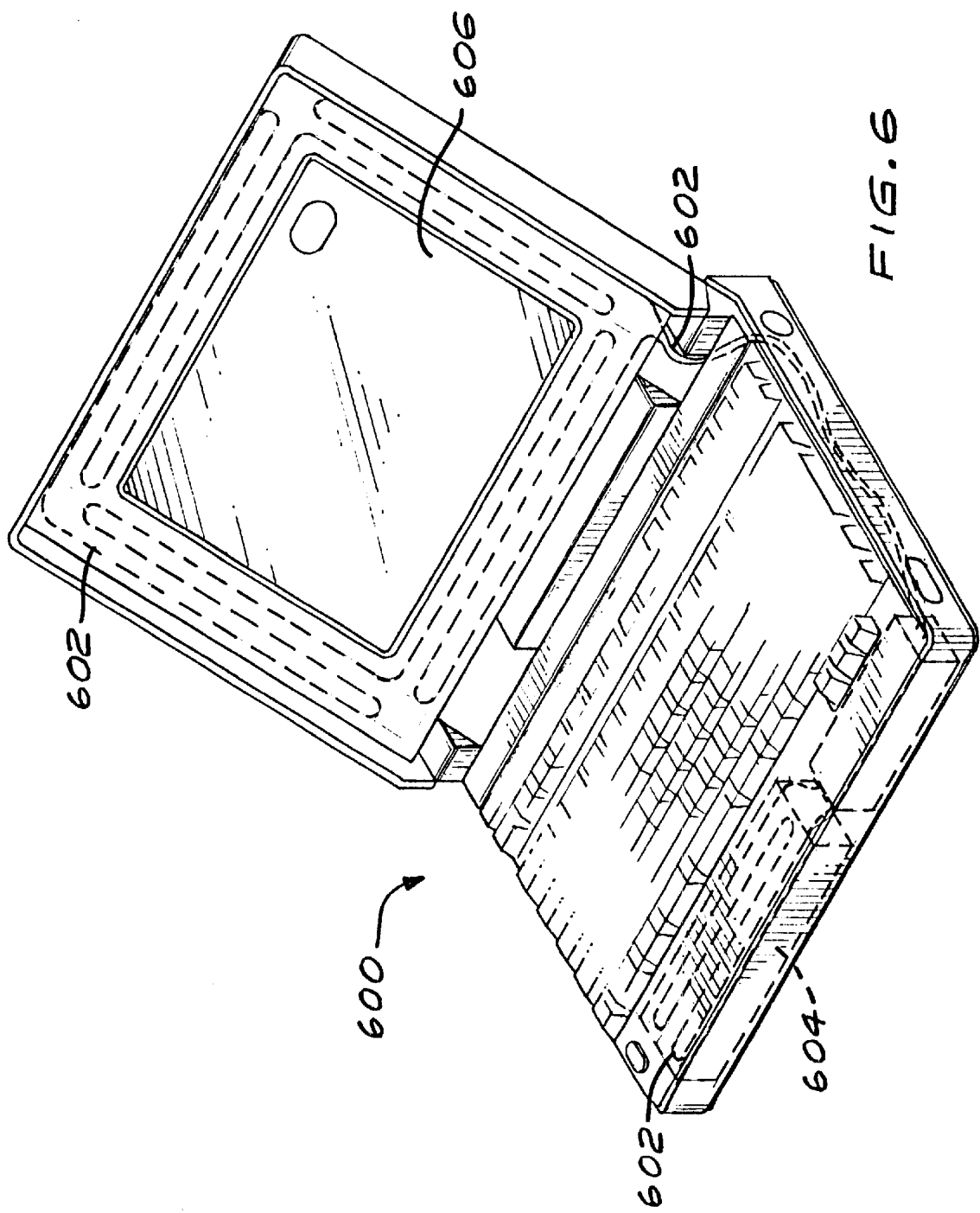

SYSTEM AND METHOD FOR PROTECTING A DIGITAL INFORMATION APPLIANCE FROM ENVIRONMENTAL INFLUENCES

CROSS REFERENCE TO RELATED APPLICATIONS

The present application is a continuation-in-part of U.S. patent application Ser. No. 09/310,164 (pending), filed May 10, 1999, abandoned, herein incorporated by reference in its entirety.

FIELD OF THE INVENTION

The present invention generally relates to the field of digital information appliances and particularly to systems and methods for protecting digital information appliances from environmental influences.

BACKGROUND OF THE INVENTION

Environmental influences can cause damage to digital information appliances as well as a loss of important data contained in the appliance. Extreme temperatures, humidity, particulate matter such as smoke and dust, harsh movement, barometric pressure, magnetic fields and the like may interfere with the electronics and mechanics in the digital information appliance. For example, environmental influences may include both cold temperatures and high ambient humidity, thereby causing water vapor to condense on components of the digital information appliance. This condensation may cause an electrical short and damage to media containing memory devices such as a typical hard drive, floppy disk drive, and the like. For instance, a user receiving a digital information appliance configured as a desktop computer may have the computer shipped in the winter months. If the user lived in a cold climate, the digital information appliance, cold from the shipping process, once brought into home of the user may form condensation on components contained in the appliance. This condensation may cause serious harm to the appliance and possibly injure the user. In another example, particulate matter such as smoke and dust can cause irreparable harm to media containing memory devices so that the data contained in these devices may be permanently lost.

Previous methods of addressing environmental influences involved warning of the presence of the environmental influence, but did not take actions to protect the digital information appliance from the environmental influence. For example, a typical computer system may warn of a danger to an environmental influence, such as a low temperature, but did not take action to protect the system. Rather, the system relied on maintenance personnel to take actions to protect the system, the system itself being defenseless to the environmental influences.

Harsh movement may also cause damage to a digital information appliance. Today, digital information appliances are available in a wide range of configurations, with some of them being portable and handheld designs. Dropping a digital information appliance may cause a great deal of damage both to the appliance and components contained in the appliance. Therefore, it may be desirable to employ methods of protecting a digital information appliance from harsh movement and to warn a user of the potentially damaging influence.

Therefore, it may be desirable to employ a system and method wherein the digital information appliance may be protected from environmental influences.

SUMMARY OF THE INVENTION

Accordingly, the present invention is directed to a system and method for protecting a digital information appliance from an environmental influence. The digital information appliance is capable of detecting an environmental influence and determining if the detected environmental influence is potentially harmful. Determining if an environmental influence is potentially harmful may include determining if the present state of the environmental influence is harmful and/or determining if a trend of the environmental influence indicates that it may become potentially harmful. If the digital information appliance detects a potentially harmful environmental influence, the digital information appliance is capable of protecting the digital information appliance. In an additional embodiment, the digital information appliance is protected in a manner corresponding to the nature of the environmental influence.

In an additional aspect of the present invention, a system and method for protecting a digital information appliance from an environmental influence includes detecting the environmental influence and determining if the detected environmental influence is potentially harmful. If the digital information appliance detects a potentially harmful environmental influence, the digital information appliance is capable of suspending operation while the potentially harmful environmental influence is present In another aspect of the present invention, a system and method for protecting a digital information appliance from a potentially harmful environmental influence including movement includes detecting movement of the digital information appliance and determining if the movement is potentially harmful to the digital information appliance. When the detected movement of the digital information appliance is determined to be potentially harmful, the digital information appliance responds to the potentially harmful movement.

In an additional aspect of the present invention, a system and method for protecting data in a digital information appliance from a potentially harmful environmental influence includes detecting a potentially harmful environmental influence and initiating a data saving routine. The data saving routine is capable of saving data contained in the digital information appliance so as to protect the data. In an exemplary embodiment, the data saving routine includes transferring data to a remote system.

In a further aspect of the present invention, a system and method for protecting a digital information appliance from a potentially harmful environmental influence including a cold temperature includes detecting a temperature of at least one of the digital information appliance and an environment of the digital information appliance and determining if at least one of the detected temperature and detected temperature trend is potentially harmful to the digital information appliance. When at least one of the detected temperature and detected temperature trend is determined to be potentially harmful to the digital information appliance, the digital information appliance is capable of initiating a warming procedure so as to warm at least a portion of the digital information appliance.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary embodiment of the present invention wherein a digital information appliance capable of protecting against environmental influences is shown;

FIG. 6 illustrates an exemplary embodiment of the present invention wherein a digital information appliance is capable of initiating a warming procedure;

DETAILED DESCRIPTION OF THE INVENTION

Figure 2A:
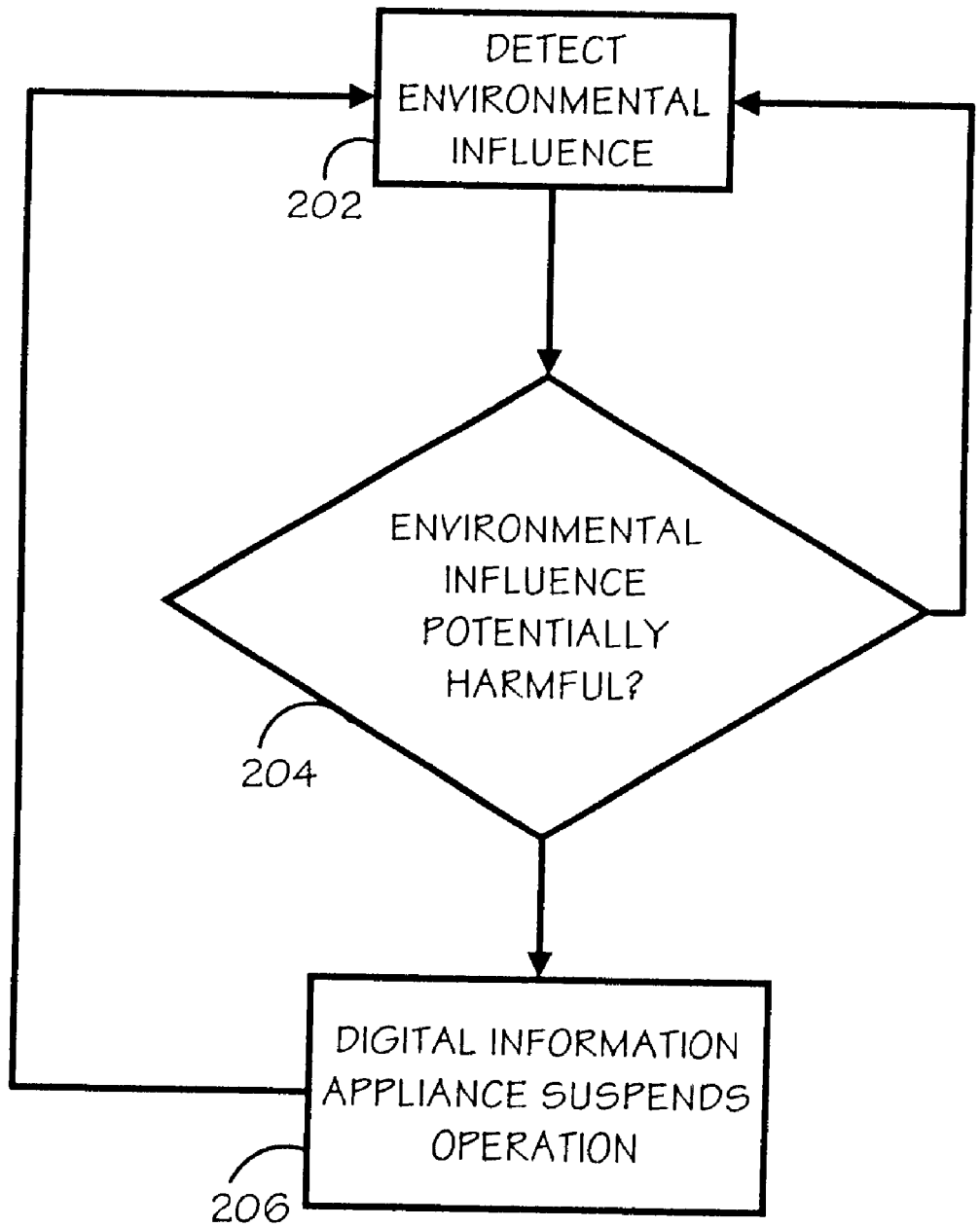
FIG. 2A is a flow diagram depicting an exemplary method of protecting a digital information appliance from environmental influences.

Reference will now be made in detail to the presently preferred embodiments of the invention, examples of which are illustrated in the accompanying drawings.

Referring generally now to FIGS. 1 through 8, exemplary embodiments of protecting digital information appliances from environmental influences are shown. Environmental influences can be very damaging to digital information appliances. Environmental influences include temperature, such as extreme hot and cold temperatures, humidity, barometric pressure, particulate matter such as dust and smoke, magnetic fields, movement, and the like. A digital information appliance includes information handling systems, convergence systems, information and Internet appliances such as portable devices utilized to provide limited functionality, including electronic books and personal scheduling devices, and the like as contemplated by a person of ordinary skill in the art.

Referring now to FIG. 1, an exemplary embodiment of the present invention is shown wherein a digital information appliance is protected from environmental influences. In this embodiment, a digital information appliance 100 includes an information handling system configured as a desktop computer. The digital information appliance 100 includes a sensor capable of detecting temperature 102, humidity 104, barometric pressure 106, magnetic fields 108, particulate matter such as dust and smoke, and other environmental influences as contemplated by a person of ordinary skill in the art. The sensor may be configured both externally 110 and internally 112 to detect environmental influences. For example, sensors 110 and 112 may be positioned to quickly ascertain the environment surrounding the digital information appliance to enable the digital information appliance to take action before the environmental influence becomes harmful.

Referring now to FIG. 2A, an exemplary method for protecting a digital information appliance from environmental influences is shown. The digital information detects environmental influences 202. If the environmental influence is determined to be potentially harmful 204, the digital information appliance prevents operation of components contained in the digital information appliance that might become damaged due to the environmental influence. For example, if dust was detected, the digital information appliance could place components such as hard drives and floppy disk drives in a "suspend" mode until the environmental influence is no longer present. In this way, the media of the components would have a greatly reduced risk of damage due to the environmental influence. In another example, the operation of a fan for cooling the digital information appliance could be suspended while the particulate matter is present so as not to draw contaminants into the digital information appliance.

Figure 2B:
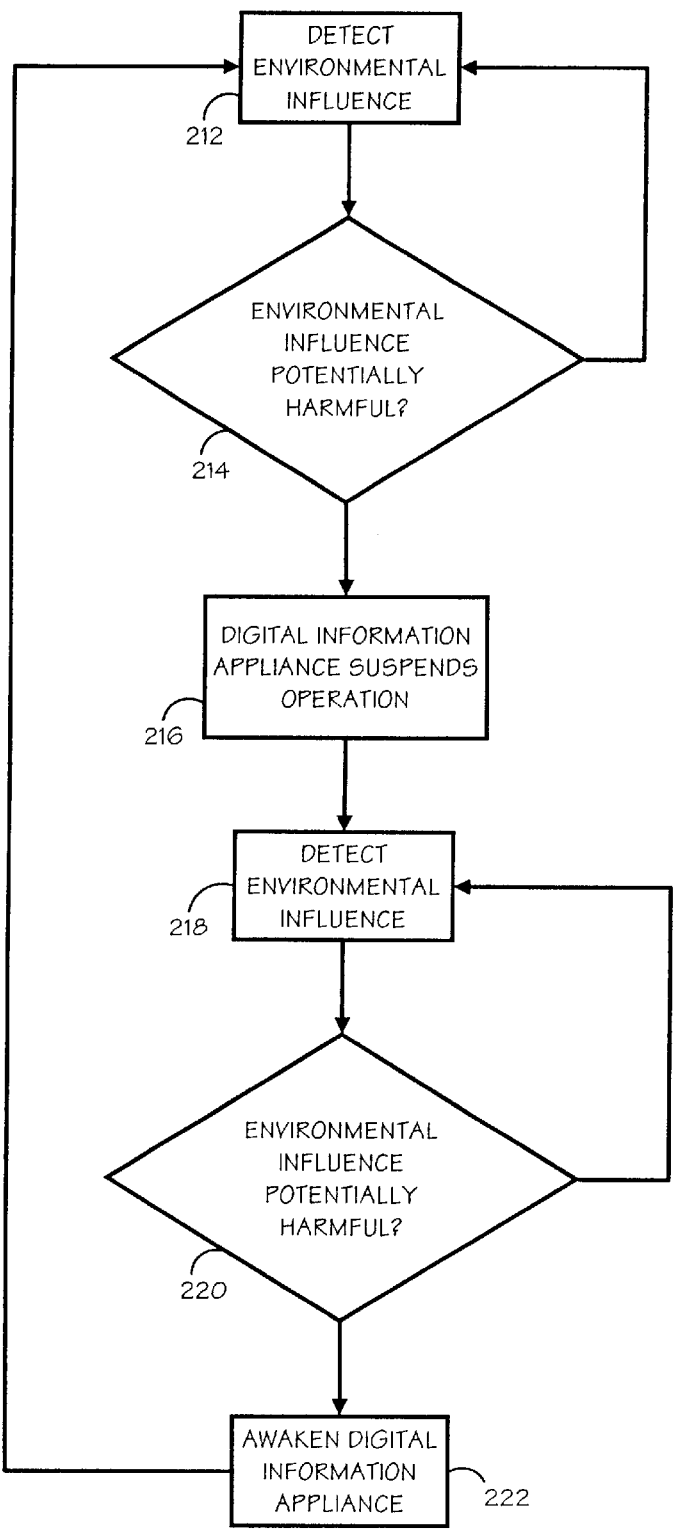
FIG. 2B is a flow diagram depicting an exemplary method of the present invention wherein the operation of the sensor may be independent so as to enable the digital information appliance to cease activation while the potentially harmful environmental influence is present.

In an additional embodiment, the operation of the sensor may be independent so as to enable the digital information appliance to cease or suspend activation while the potentially harmful environmental influence is present, an example of which is shown in FIG. 2B. If the digital information appliance detected 212 an environmental influence that is potentially harmful to the digital information appliance while operating 214, the operation of the digital information appliance could be suspended while the environmental influence is present 216. The sensor may then continue detecting the environmental influence 218 and determine if the environmental influence remains potentially harmful 220. For example, the sensor may sample environmental influences periodically to determine the presence of the environmental influence. Once the danger has passed, the sensor could waken the digital information appliance 222 from the suspend mode to continue operation.

Figure 2C:
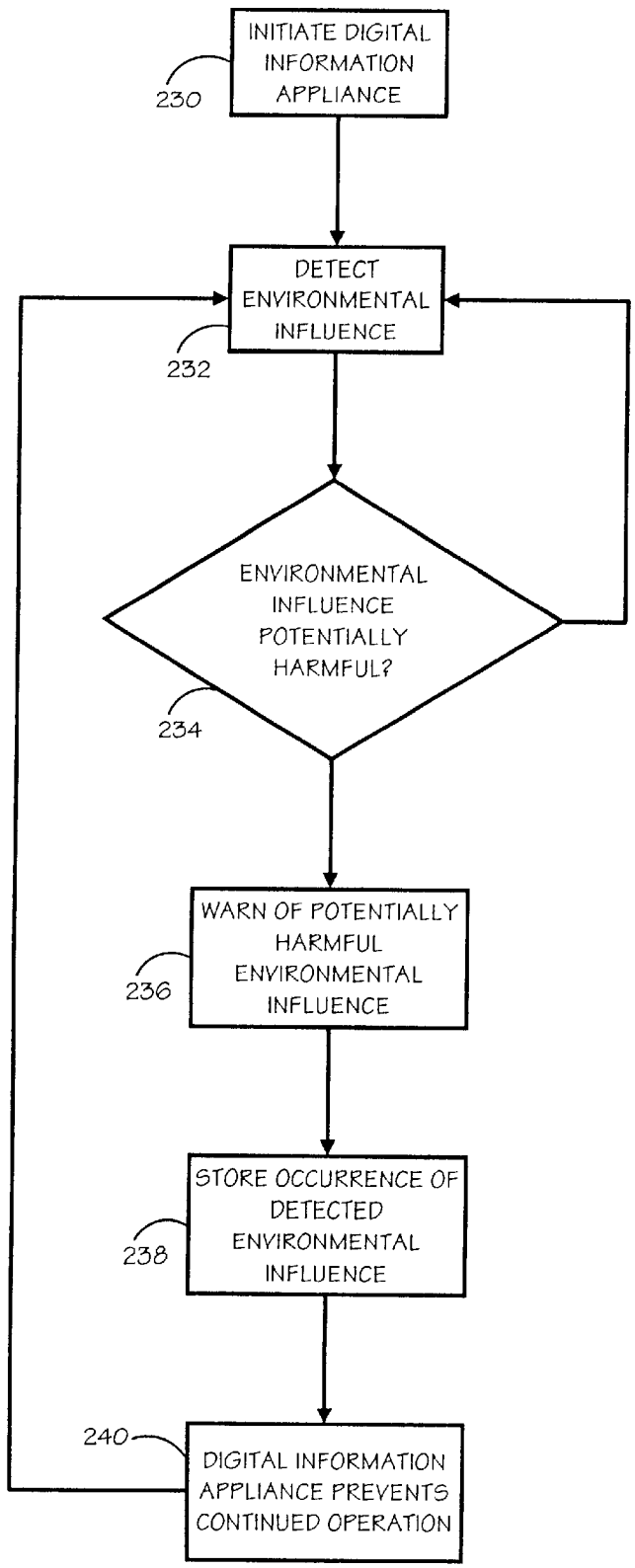
FIG. 2C is a flow diagram depicting an exemplary method of protecting a digital information appliance from environmental influences during initiation of the digital information appliance.

Referring now to FIG. 2C, an additional exemplary method for protecting a digital information appliance from environmental influences during initiation of the digital information appliance is shown. First, the digital information appliance is initiated. Initiation of the digital information appliance may include both "cold" and "warm" boots. The digital information appliance may then detect environmental influences 232 and determine if the detected environmental influences are potentially harmful to the digital information appliance 234. In one embodiment, the digital information appliance detects and determines environmental influences during the appliance boot procedure so as to minimize potential damage to the digital information appliance. For example, detection and determination may be performed as a part of the basic input/output system (BIOS) so as not to require the booting of the operating system. In this way, the digital information appliance may determine if it is safe to boot and operate before the operating system is even loaded on the digital information appliance.

If the detected environmental influences are determined to be potentially harmful to the digital information appliance, the appliance may warn of the presence of the influence 236. Warning may include both audio and visual warnings. For example, if the presence of potentially harmful environmental influences is detected as a part of the basic input/output system (BIOS) boot procedure, an audio warning may be given even before the video components are initialized. In this way, determining if it is safe to boot the digital information appliance may minimize potential damage to components caused by booting the components in the presence of the potentially harmful environmental influences.

The digital information appliance may then store an occurrence of the detected environmental influence in a memory device 238. The memory device may include media containing memory devices such as hard disks, floppy disks, writeable compact disks, and the like, as well as non-media containing memory such as semiconductor based memory including nonvolatile random access memory (NVRAM), electrically erasable programmable read-only memory (EEPROM), flash ram, programmable read-only memory (PROM), erasable programmable read-only memory (EPROM), digital signal processor (DSP) with memory, and the like. It may be preferable to utilize non-media based memory so as to prevent damage to the media due to the detected environmental influences.

Next, the digital information appliance may suspend operation while the detected potentially harmful environmental influence is present 240. Suspension of operation may correspond to the type of environmental influence detected. For example, if environmental conditions were detected that might cause condensation to form in the digital information appliance, suspension of operation may include keeping the hard drives from operating while the condensation is present. In another example, if a high temperature was detected, components in the digital information appliance that generate high amounts of heat may be suspended from operation to prevent additional damage to the digital information appliance. It should be realized that a wide variety of actions may be taken and methods utilized to protect the digital information appliance from corresponding environmental influences, the previous examples being exemplary methods thereof.

Figure 3A:
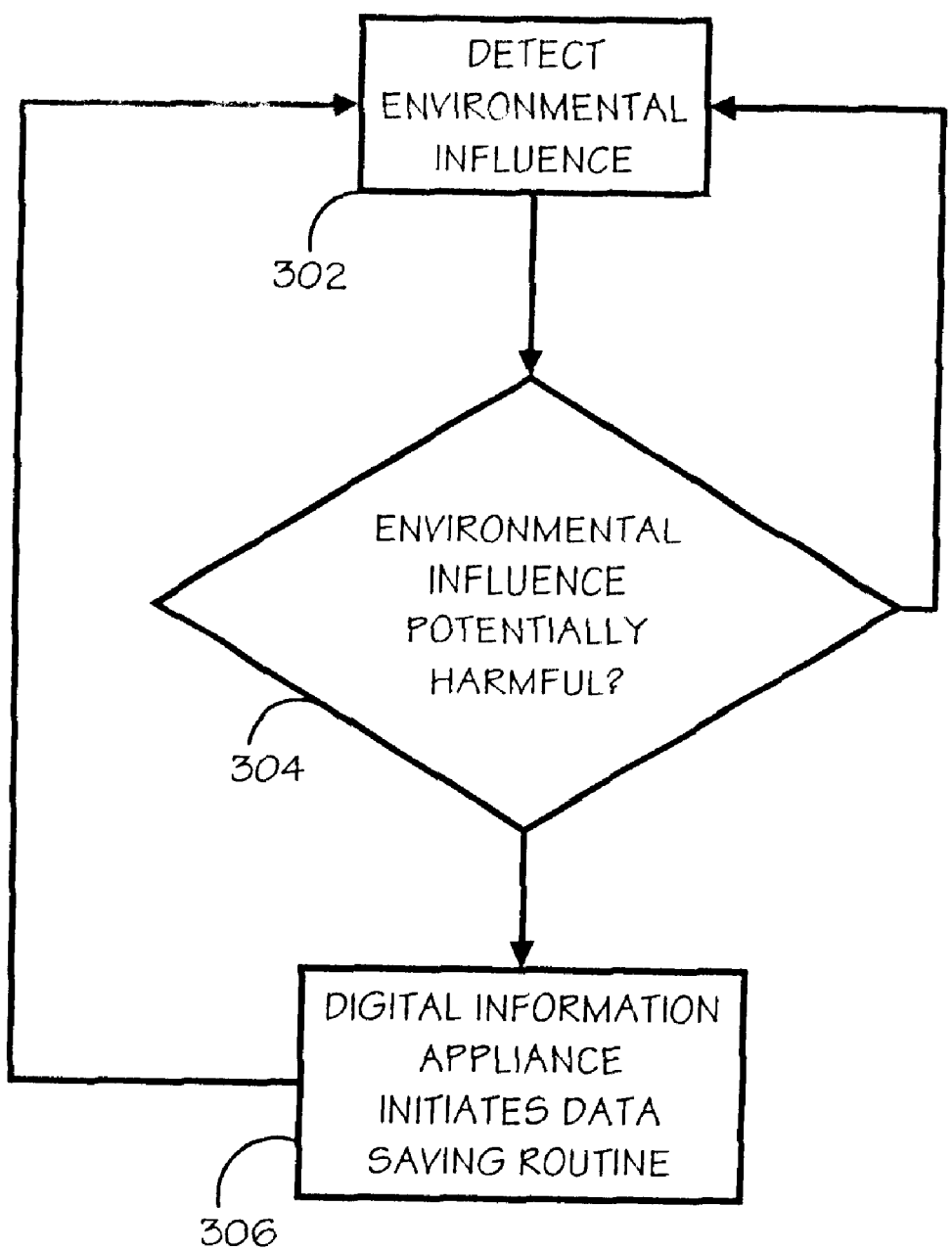
FIG. 3A is a flow diagram depicting an exemplary method of the present invention wherein a data saving routine capable of saving data contained in the digital information appliance to protect the integrity of the data is shown.
Figure 3B:
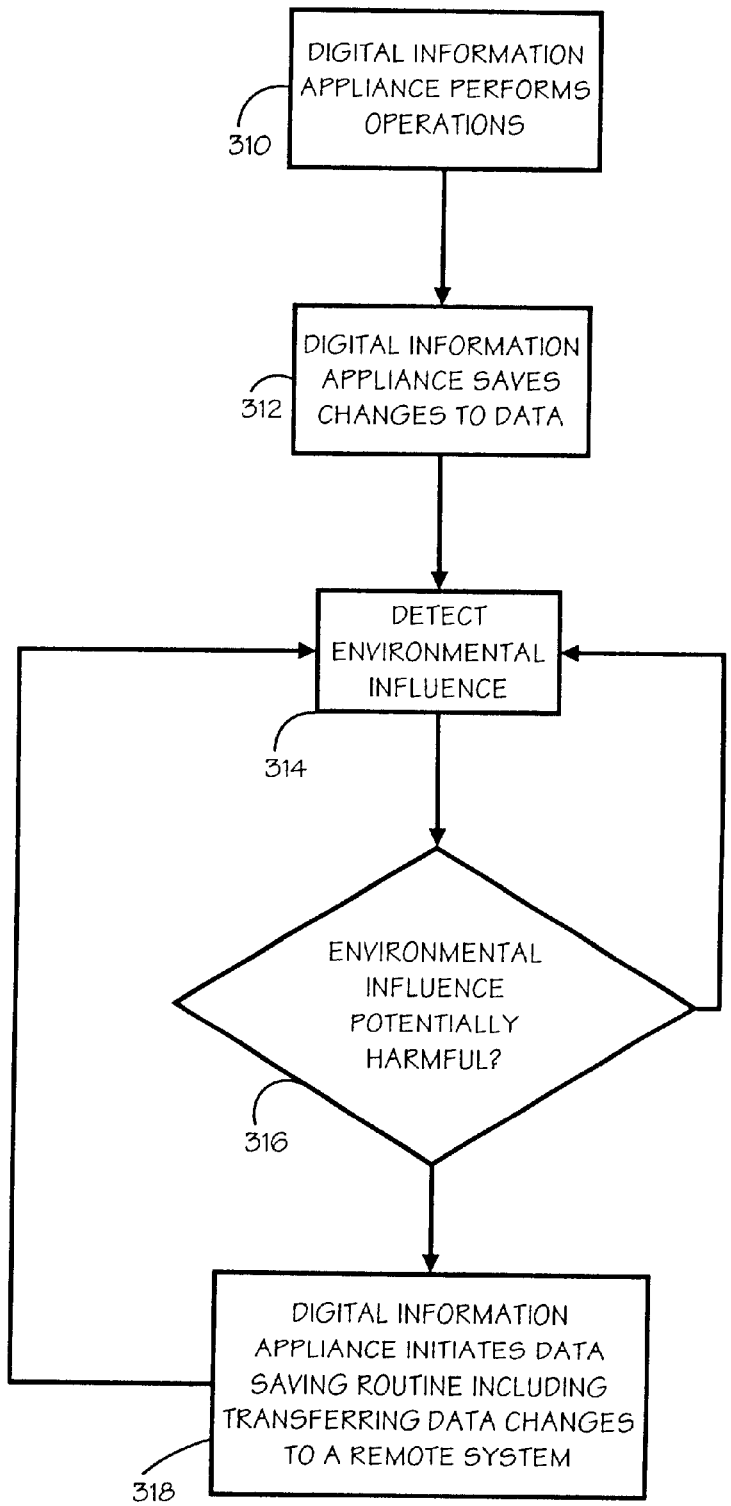
FIG. 3B illustrates an additional exemplary method of protecting data from environmental influences wherein the digital information appliance transfers data to a remote system.

Referring generally now to FIGS. 3A and 3B, additional exemplary methods for protecting digital information appliances from environmental influences are shown wherein the digital information appliance saves data contained in the digital information appliance in response to potentially harmful environmental influences. Data contained in a digital information appliance may become especially vulnerable to environmental influences. For example, environmental influences may include both cold temperatures and high humidity thereby endangering the digital information appliance with condensation. The resulting condensation may cause a short circuit or damage to media contained in a memory device. Therefore, it may be desirable to save data contained in the digital information appliance to protect the integrity of the data, an example of which is shown in FIG. 3A. A digital information appliance detects environmental influences 302 and determines if the environmental influence is potentially harmful 304. If the environmental influence is determined to be potentially harmful, the digital information appliance initiates a data saving routine 306 to protect the data from the environmental influence.

Referring now to FIG. 3B, an additional exemplary method for protecting data from environmental influences is shown wherein the digital information appliance transfers data to a remote system. The digital information appliance performs operations 310 wherein it may be beneficial to save data, for instance, working on a spreadsheet, word processor, web browsing, and the like. To save both time and resources, it may be desirable to save only changes made to the data so as to enable the data to be saved more quickly and to utilize fewer resources. Therefore, if the digital information appliance detects environmental influences 314 and the influences are determined to be potentially harmful 316, the digital information appliance may initiate a data saving routine which includes transferring just the changes to the data 318 to a remote system. The remote system may include a digital information appliance or other type of system capable of storing data as contemplated by a person of ordinary skill in the art. For example, the remote system may be accessible over a network, such as a wireless network, Internet, and the like to protect the data from the environmental influence. In this way, the digital information appliance may transfer the data even if the environmental influence immediately threatens the appliance. It should be apparent that a variety of portions and quantities of data may be transferred as contemplated by a person of ordinary skill in the art without departing from the spirit and scope of the present invention.

Figure 4:
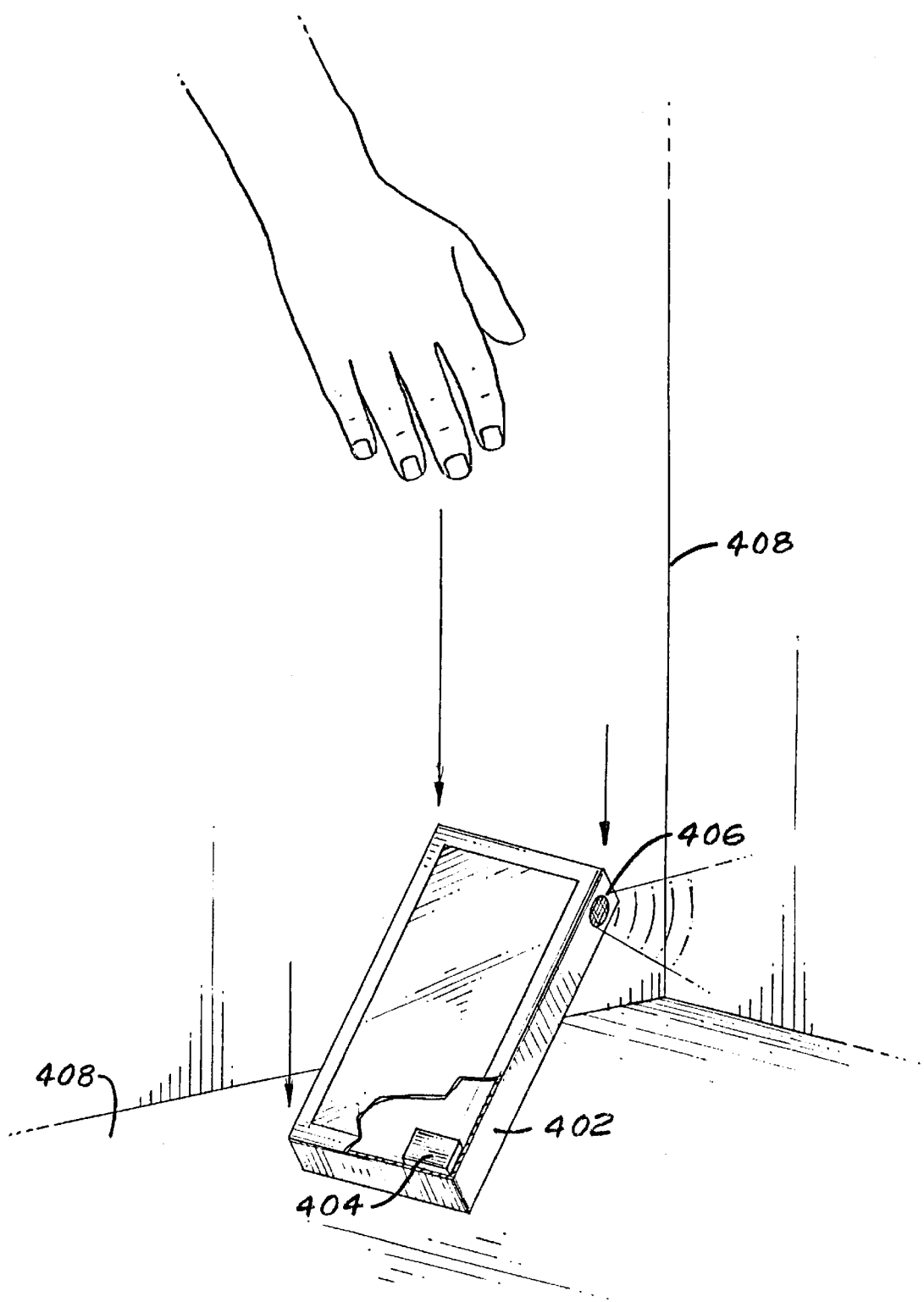
FIG. 4 illustrates an exemplary embodiment for protecting a digital information appliance from environmental influences including motion.

Referring now to FIG. 4, an exemplary embodiment for protecting a digital information appliance from environmental influences including motion is shown. Digital information appliances include hand-held portable appliances that generally permit limited functionality to enable a user to access desired features, such as a scheduler, electronic book, wireless Internet appliance, and the like. One of the problems encountered with this increased portability is the exposure to environmental influences, including potentially harmful motion. For example, dropping a digital information appliance may cause damage to media-containing memory devices in the appliance, the display device, and the like, an example of which is shown in FIG. 4. If a user accidentally drops the digital information appliance 402, the user may be given an audio warning 406. A sensor 404 included in the digital information appliance detects the movement. The sensor may include an accelerometer, available in a chip form from Texas Instruments, Austin, Tex., as the ACH04-08-05 shock sensor. The sensor 404 may also include a free fall sensor such as a 3-axis accelerometer array prior to impact when the detector and thus the digital information appliance is falling, such a device is available from Analog Devices of Norwood, Mass. The sensor may also include a positional sensor that utilizes waves to determine when the position of the digital information appliance 402 changes relative to its surrounds 408 similar to the methods used in radar technology. It should be apparent that a variety of sensors may be utilized to detect movement of the digital information appliance and not depart from the spirit and scope of the present invention.

Figure 5A:
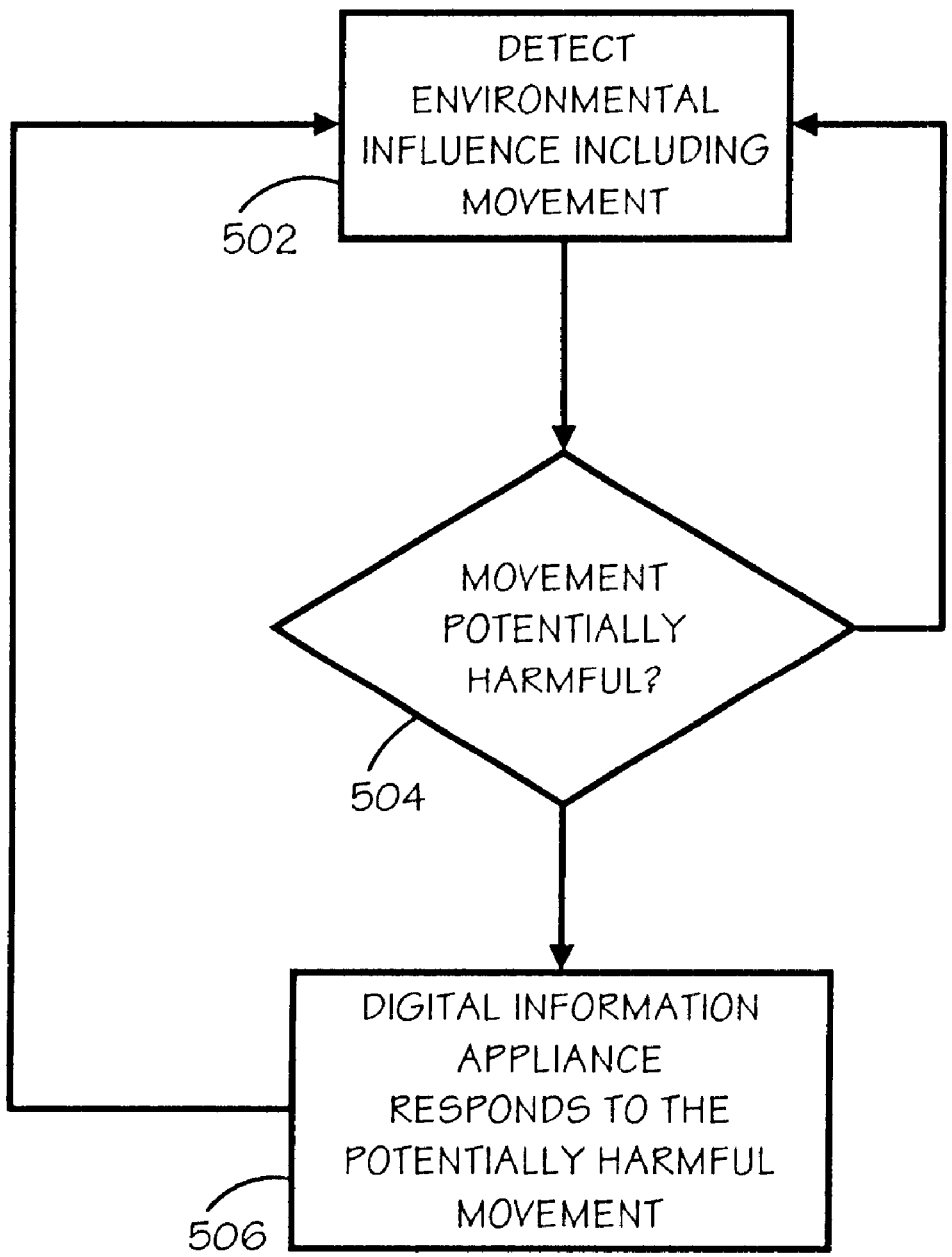
FIG. 5A is a flow diagram depicting an exemplary method of protecting a digital information appliance from potentially harmful movement.

Once the potentially harmful movement is detected, there are a wide variety of responses that may be utilized to protect the digital information appliance. As shown in FIG. 5A, an exemplary method for protecting a digital information appliance from potentially harmful movement is shown. A digital information appliance detects movement of the digital information appliance 502. If the movement is determined to be potentially harmful 504, the digital information appliance may respond to the potentially harmful movement 506 so as to protect the digital information appliance. There are a variety of responses that may be utilized with the present invention to protect a digital information appliance from potentially harmful movement without departing from the spirit and scope of the present invention.

Figure 5B:
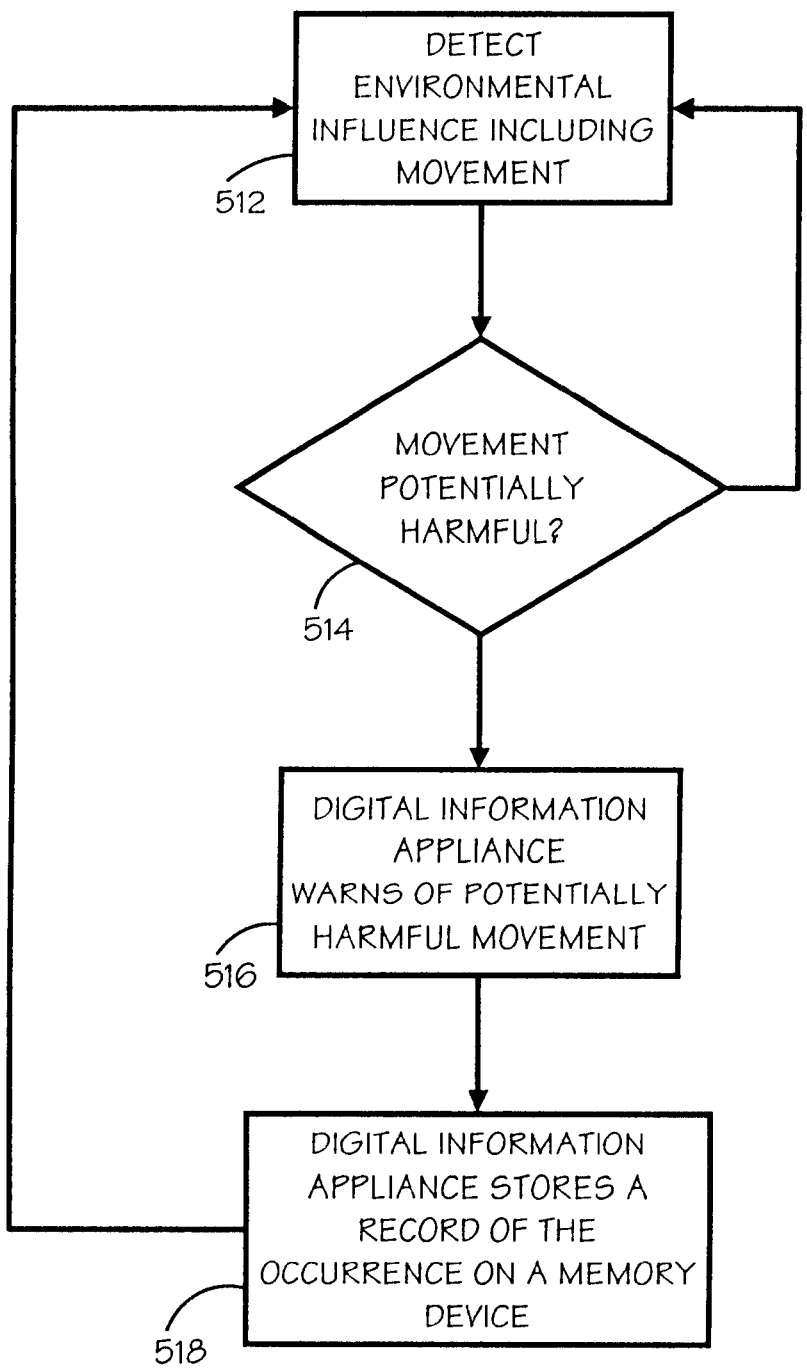
FIG. 5B depicts an additional exemplary method of protecting a digital information appliance from potentially harmful movement wherein the digital information appliance stores occurrences of potentially harmful environmental influences.

Referring now to FIG. 5B, an exemplary method for protecting a digital information appliance from potentially harmful movement is shown. The digital information appliance detects environmental influences including movement 512. The digital information appliance then determines if the movement is potentially harmful 514. If the movement is potentially harmful, the digital information appliance may warn of the potentially harmful movement 516. Such a warning may be audio and/or visual so as to warn a user of the potential damage to the digital information appliance. Further, the warning may include utilizing a wireless network connect to notify a user remote from the digital information appliance of the potential harm. It may also be desirable to keep a record of the potentially harmful movement 518 so that a user may determine the cause of damage to the digital information appliance. Additionally, this record may be utilized to predict future occurrences so that the digital information appliance may protect itself. For example, if a digital information appliance detected a movement that proved harmful to the appliance in the past, then if a similar movement was detected the digital information appliance may then take steps to minimize and prevent the damage to the appliance.

Figure 5C:
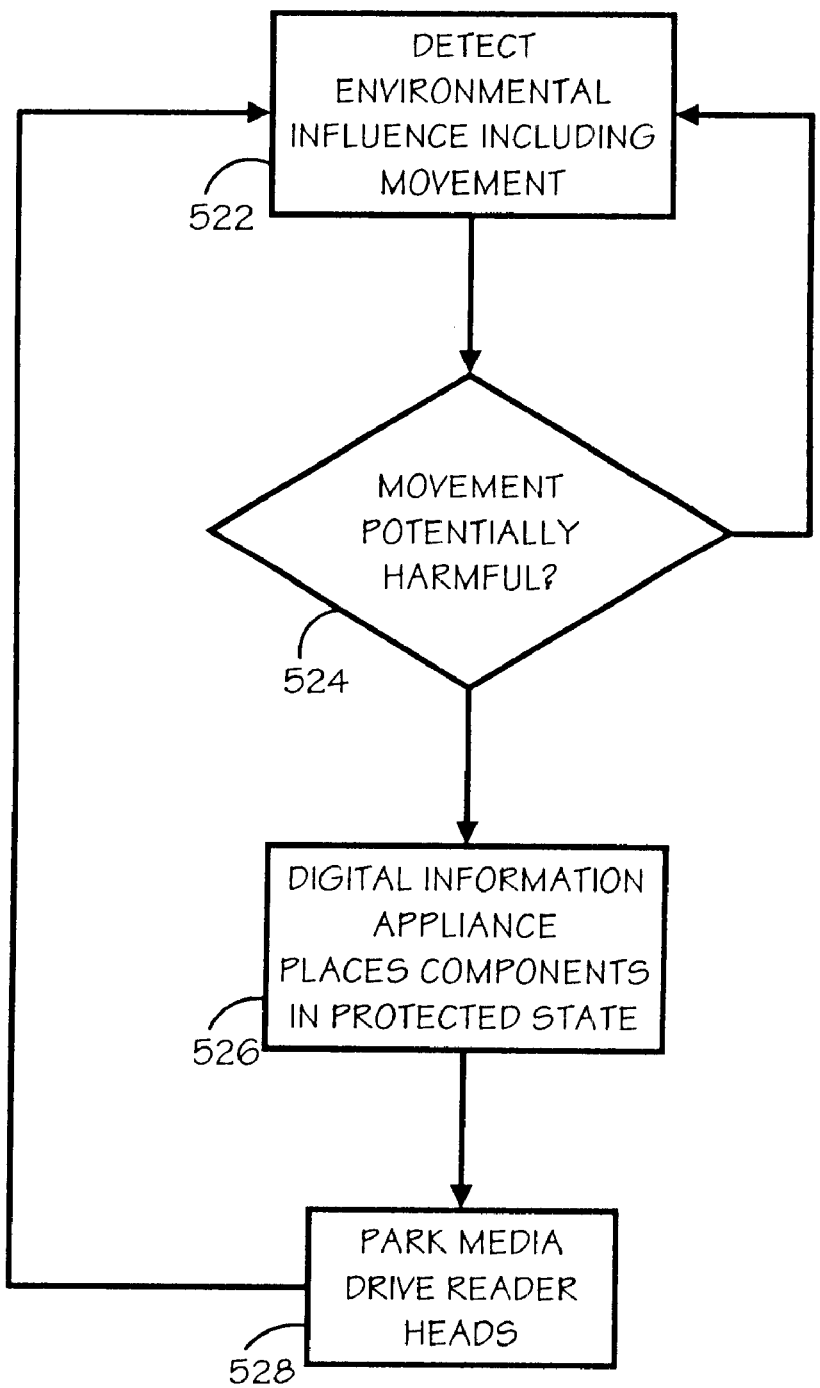
FIG. 5C depicts a further exemplary method of protecting a digital information appliance from potentially harmful movement wherein the digital information appliance is capable of placing components in a protected state in response to the detected potentially harmful movement.

Referring now to FIG. 5C, an additional exemplary method for protecting a digital information appliance from potentially harmful movement is shown. The digital information appliance detects environmental influences including movement 522. The digital information appliance then determines if the movement is potentially harmful 524. If the movement is potentially harmful, the digital information appliance places components in a protected state 526. For example, this protected state may include parking the heads of a media drive so as not to damage the media and/or the heads 528. In other examples, the monitor may be placed in a suspend state, drive doors closed, data saved, and other methods of protecting the digital information appliance from an environmental influence as contemplated by a person of ordinary skill in the art. With the increased sensitivity of modem motion sensors, harmful movement may be detected in times of substantially less than a second. In this way, once the digital information appliance detects that it is being dropped, such as detecting a free-fall state, the digital information appliance can protect components contained in the system before the damaging event occurs.

Referring now to FIG. 6, an exemplary embodiment for protecting a digital information appliance is shown wherein the environmental influence includes a potentially harmful cold temperature. A digital information appliance 600, in this instance designed as an information handling system configured as a portable computer, is capable of initiating a warming procedure to protect the digital information appliance from potentially harmful cold temperatures. A warming device 602, such as a heating coil, may be used to protect the digital information appliance from cold related influences. For example, if the temperature is low and the humidity is sufficiently high, condensation may form on the digital information appliance, which may cause electrical shorts and loss of data. By enabling the digital information appliance to warm itself, the appliance may prevent and/or delay this type of damage. In an additional example, certain components may be particularly susceptible to cold and condensation, such as hard drives 604 and LCD screens 606. In another example, a battery contained in the digital information appliance may power the warming device, such as the battery typically used to power the appliance. By utilizing the present invention, the digital information appliance may operate in an extended range of temperatures.

Figure 7A:
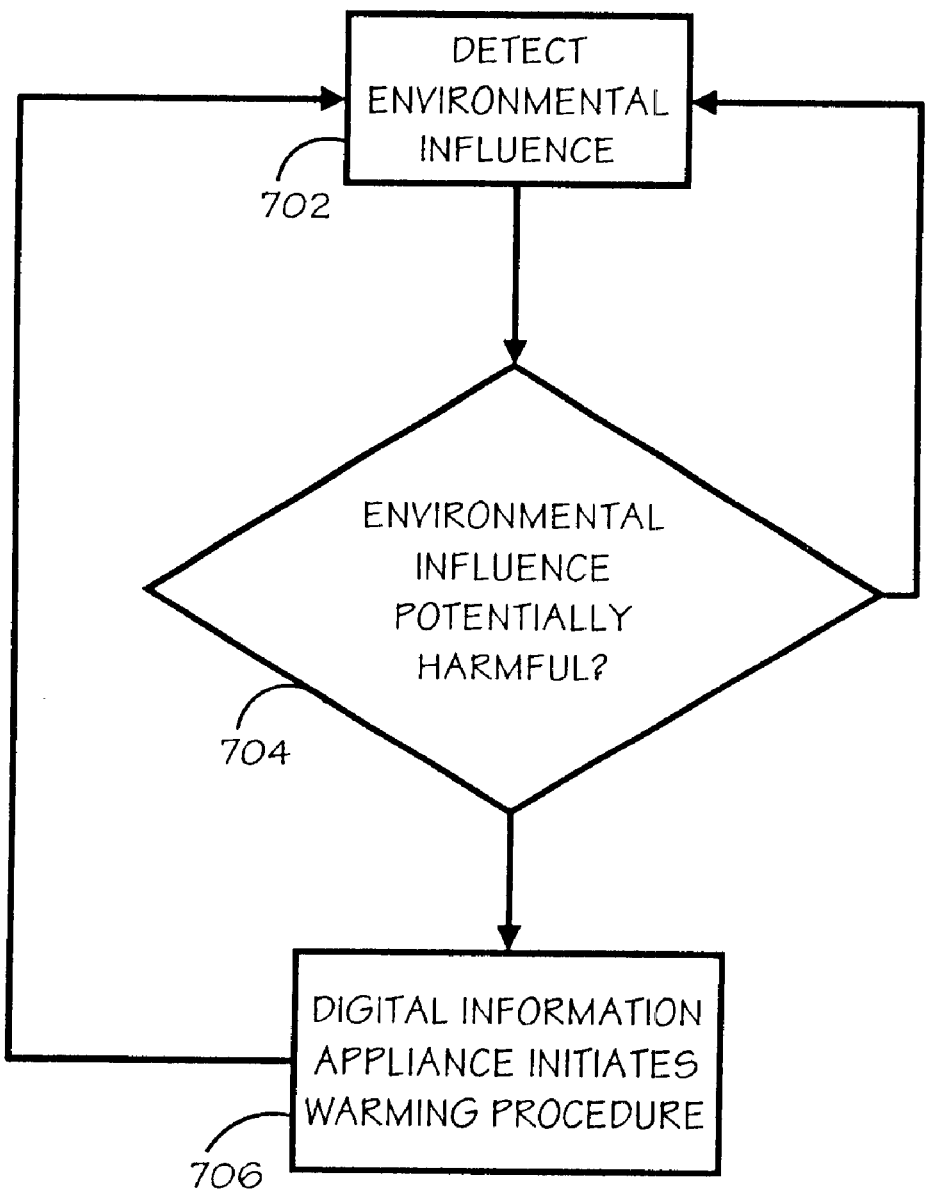
FIG. 7A is a flow diagram depicting an exemplary method wherein a digital information appliance capable of detecting a potentially harmful environmental influence including cold temperatures is capable of initiating a warming procedure wherein components susceptible to cold temperatures are warmed.

Further it may be preferable to warm specific portions of the digital information appliance as needed. As shown in FIG. 7A, if a digital information appliance detects 702 a potentially harmful environmental influence including cold temperatures 704 the appliance may warm components susceptible to the cold 706. For example, the digital information appliance may warm the hard drive 604 (FIG. 6) and display device, such as a LCD monitor 606 (FIG. 6), so as to enable the digital information appliance to operate in the cold temperature. In this way, the digital information appliance may warm only the components susceptible to the cold temperature and leave other components suitable for operation in cold temperatures in a natural state, thereby conserving power.

Figure 7B:
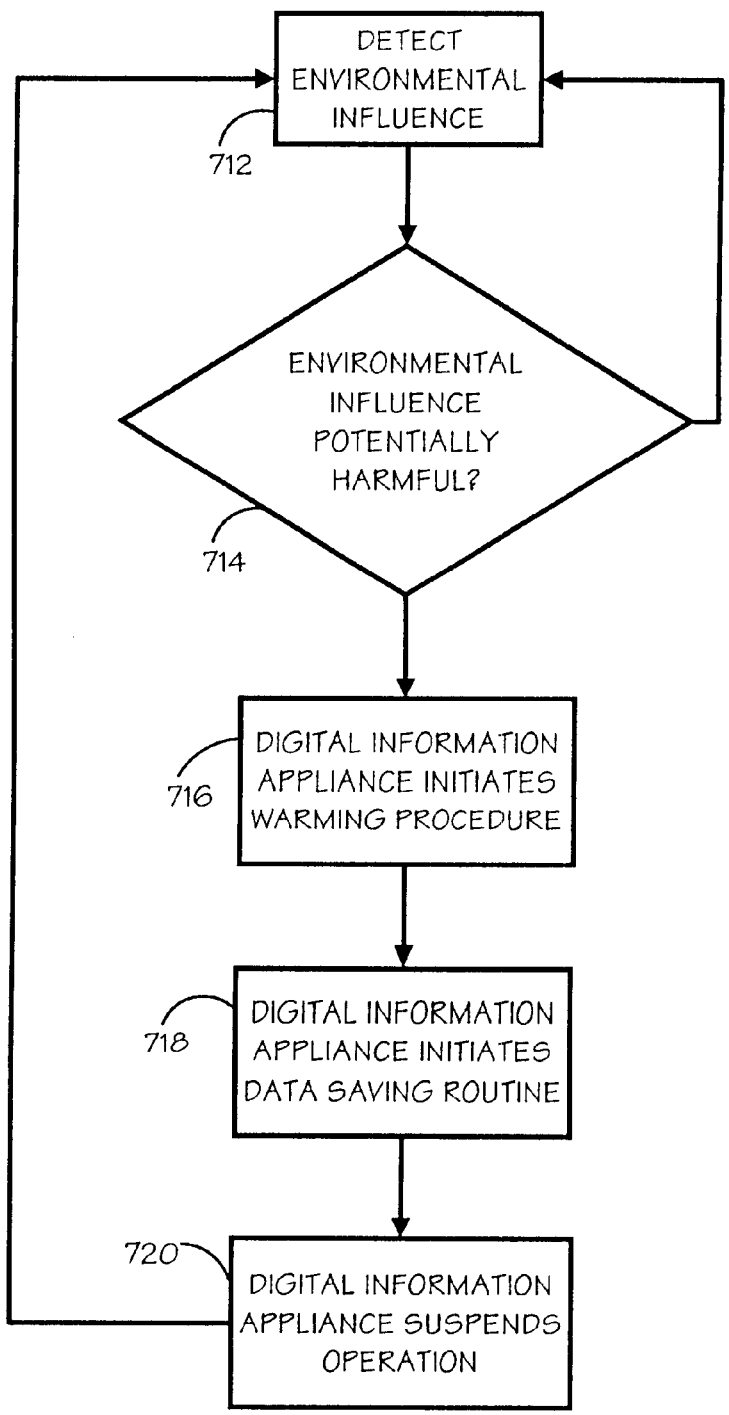
FIG. 7B depicts an exemplary flow diagram wherein the digital information appliance is capable of initiating a warming procedure to enable the digital information appliance to save data and suspend operation to protect both the integrity of the data and the digital information appliance from potential damage.

Further, the warming procedure may be used to enable the digital information appliance to save data contained in the digital information appliance and then to suspend operation to protect both the integrity of the data and the digital information appliance from potential damage, as shown in FIG. 7B. The digital information appliance may detect an environmental influence 712 and determine if it is potentially harmful 714. This may include determining if a trend of the environmental influences is progressing to the point where it may become potentially harmful. For example, the digital information appliance may save a plurality of temperature readings, and if the plurality of readings indicate that the temperate is going to drop to harmful levels, the digital information appliance may realize this potentially harmful situation and take appropriate action. The digital information appliance may initiate a warming procedure 714 and begin a data saving routine 716 to protect the data. By utilizing the warming procedure, the amount of time the digital information appliance may operate in the cold temperature may be extended. After the data saving routine is completed, the digital information appliance may suspend operation 718 while the potentially harmful influence is present, an example of which was shown in FIG. 2A.

Figure 8:
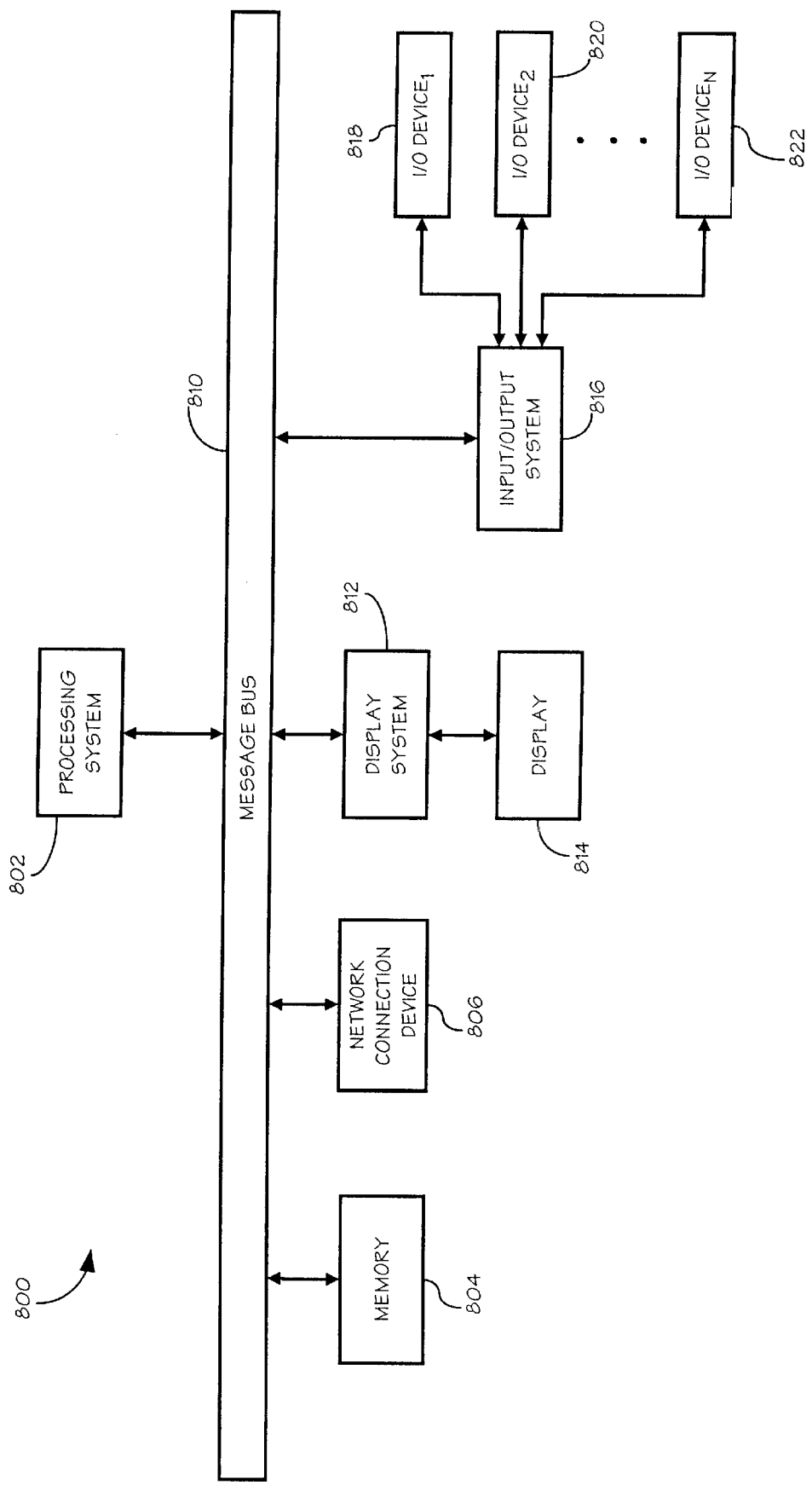
FIG. 8 is a block diagram of an exemplary digital information appliance operable to embody the present invention.

Referring now to FIG. 8, a hardware system in accordance with the present invention is shown. The hardware system shown in FIG. 8 is generally representative of the hardware architecture of a digital information appliance of the present invention. A controller, for example, a processing system 802, controls the digital information appliance 800. The processing system 802 includes a central processing unit such as a microprocessor or microcontroller for executing programs, performing data manipulations and controlling the tasks of the digital information appliance 800. Communication with the processing system 802 may be implemented through a system bus 810 for transferring information among the components of the digital information appliance 800. The system bus 810 may include a data channel for facilitating information transfer between storage and other peripheral components of the digital information appliance 800. The system bus 810 further provides the set of signals required for communication with processing system 802 including a data bus, address bus, and control bus. The system bus 810 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 810 may be compliant with any promulgated industry standard. For example, the system bus 810 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the digital information appliance 800 includes a memory 804. In one embodiment, memory 804 is provided on SIMMs (Single In-line Memory Modules), while in another embodiment, memory 804 is provided on DIMMs (Dual In-line Memory Modules), each of which plugs into suitable sockets provided on a motherboard holding many of the other components shown in FIG. 8. Memory 804 includes standard DRAM (Dynamic Random-Access Memory), EDO (Extended Data Out) DRAM, SDRAM (Synchronous DRAM), or other suitable memory technology. Memory 804 may also include auxiliary memory to provide storage of instructions and data that are loaded into the memory 804 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The digital information appliance 800 may further include a network connection device 806. The network connection device 806 communicates between the digital information appliance 800 and a remote device, such as external devices, networks, information sources, or host systems that administer a plurality of digital information appliances. For example, host systems such as a server or information handling system, may run software controlling the digital information appliance, serve as storage for a digital information appliance, or coordinate software running separately on each digital information appliance. The network connection device 806 may provide or receive analog, digital, or radio frequency data. The network connection device 806 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device 806 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The digital information appliance 800 may further include a display system 812 for connecting to a display device 814. The display system 812 may comprise a video display adapter having all of the components for driving the display device, including video random access memory (VRAM), buffer, and graphics engine as desired. The display device 814 may comprise a liquid-crystal display (LCD), or may comprise alternative type of display technologies, such as a light-emitting diode (LED) display, gas or plasma display, or employ flat-screen technology.

A digital information appliance 800 may further include an input/output (I/O) system 816 for connecting to one or more I/O devices 818, 820 up to N number of I/O devices 822. Input-Output devices 818 through 822 may include sensors for detecting environmental influences, including temperature, humidity, particulate matter, barometric pressure, magnetic fields, and any other environmental influence as contemplated by a person of ordinary skill in the art. It may be desirable to enable the sensor to operate independently of the digital information appliance, so as to enable the digital information appliance to be in a "suspend" mode yet still enabling operation of the sensor. This may include a second logic system capable of implementing a program of instructions included as a part of the sensor. Input/output system 816 may comprise one or more controllers or adapters for providing interface functions between one or more of I/O devices 818–822. For example, input/output system 816 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the digital information appliance 800 of FIG. 8 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 804 of one or more digital information appliances configured generally as described in FIG. 8. Until required by the digital information appliance, the set of instructions may be stored in another readable memory device. For example, the set of instruction may be stored in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for protecting a digital information appliance from environmental influences of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for protecting a digital information appliance from an environmental influence, comprising:

detecting an environment influence;

evaluating an environmental influence trend based upon the detected environment influence; and determining if the detected environmental influence trend is potentially harmful;

wherein the digital information appliance determines the environmental influence trend is potentially harmful, the digital information appliance is capable of protecting the digital information appliance.

2. The method as described in claim 1, wherein the environmental influence includes at least one of temperature, movement, humidity, barometric pressure, particulate matter and magnetic fields.

3. The method as described in claim 1, wherein protecting the digital information appliance includes suspending operation of the digital information appliance while the potentially harmful environmental influence is present.

4. The method as described in claim 3, wherein an occurrence of an environmental influence is stored by a memory device.

5. The method as described in claim 4, wherein the occurrence is capable of being stored while the digital information appliance suspends operation.

6. The method as described in claim 3, further comprising initiating the digital information appliance, and wherein the detected environmental influence is determined to be potentially harmful, suspending operation of the digital information appliance includes preventing the activation of the digital information appliance.

7. The method as described in claim 1, wherein protecting the digital information appliance includes initiating a data saving routine wherein the data saving routine is capable of saving data contained in the digital information appliance so as to protect the data.

8. The method as described in claim 7, wherein the data saving routine includes transferring data to a remote system so as to protect the data.

9. The method as described in claim 8, wherein the data is transferred to the remote system over a network.

10. The method as described in claim 9, wherein the network is a wireless network, the digital information appliance includes a wireless modem to transfer the data to the remote system.

11. The method as described in claim 7, wherein the environmental influence includes at least one of a potentially harmful cold temperature and potentially harmful cold temperature trend, further comprising initiating a warming procedure so as to enable the digital information appliance to initiate the data saving routine without damaging the digital information appliance.

12. The method as described in claim 1, wherein the environmental influence includes at least one of a potentially harmful cold temperature and potentially harmful cold temperature trend, protecting the digital information appliance includes initiating a warming procedure.

13. The method as described in claim 12, wherein the detected temperature trend is determined by storing temperatures and ascertaining whether the stored temperatures indicate a potentially harmful trend.

14. The method as described in claim 12, wherein the warming procedure includes warming at least a portion of the digital information appliance so as to be capable of transferring data without at least one of damaging the digital information appliance and corrupting the data.

15. The method as described in claim 12, wherein the detected temperature is determined to be harmful by at least one of being less than and equal to a predetermined temperature.

16. The method as described in claim 1, wherein the environmental influence includes movement, protecting the digital information appliance includes detecting movement of the digital information appliance; and determining if the movement is potentially harmful to the digital information appliance;

wherein the detected movement of the digital information appliance is determined to be potentially harmful, the digital information appliance responds to the potentially harmful movement.

17. The method as described in claim 16, wherein the digital information appliance responds by issuing a warning.

18. The method as described in claim 17, wherein the warning includes notifying a remote location of the potentially harmful environmental influence.

19. The method as described in claim 18, wherein notifying includes placing a phone call to a predetermined number and playing a message notifying the remote location of the potentially harmful movement to the digital information appliance.

20. The method as described in claim 16, wherein the potentially harmful movement is detected, the digital information appliance is capable of initiating a data saving routine.

21. The method as described in claim 16, wherein the digital information appliance responds by placing at least one component included in the digital information appliance in a protected state so as to minimize damage to the component.

22. The method as described in claim 21, wherein the component includes at least one of a hard drive, floppy drive and optical drive, positioning a read unit of the component so as not to damage at least one of the read unit and media.

23. The method as described in claim 1, wherein an occurrence of an environmental influence is stored by a memory device.

24. The method as described in claim 1, wherein protecting the digital information appliance corresponds to the type of environmental influence determined to be potentially harmful.

25. A digital information appliance capable of responding to a potentially harmful environmental influence, the digital information appliance comprising:
a processor for executing a program of instruction on the digital information appliance;
a sensor coupled to the processor, the sensor capable of detecting the environmental influence; and
a memory coupled to the processor for storing the program of instructions executable by at least one of said processor and said sensor wherein the program of instructions configured the digital information appliance to
detect an environment influence;
evaluate an environmental influence trend based upon the detected environment influence; and
determine if the detected environmental influence trend is potentially harmful;
wherein the digital information appliance determines the environmental influence trend is potentially harmful, the digital information appliance is capable of protecting the digital information appliance.

26. The digital information appliance as described in claim 25, wherein the sensor is capable of independent operation.

27. The digital information appliance as described in claim 25, wherein the environmental influence includes at least one of temperature, movement, humidity, barometric pressure, particulate matter and magnetic fields.

28. The digital information appliance as described in claim 25, wherein protecting the digital information appliance includes suspending operation of the digital information appliance while the potentially harmful environmental influence is present.

29. The digital information appliance as described in claim 28, wherein an occurrence of the environmental influence is stored by a memory device.

30. The digital information appliance as described in claim 29, wherein the occurrence is capable of being stored while the digital information appliance suspends operation.

31. The digital information appliance as described in claim 28, further comprising initiating the digital information appliance, and wherein the detected environmental influence is determined to be potentially harmful, suspending operation of the digital information appliance includes preventing the activation of the digital information appliance.

32. The digital information appliance as described in claim 25, wherein protecting the digital information appliance includes initiating a data saving routine wherein the data saving routine is capable of saving data contained in the digital information appliance so as to protect the data.

33. The digital information appliance as described in claim 32, wherein the data saving routine includes transferring data to a remote system so as to protect the data.

34. The digital information appliance as described in claim 33, wherein the data is transferred to the remote system over a network.

35. The digital information appliance as described in claim 34, wherein the network is a wireless network, the digital information appliance includes a wireless modem to transfer the data to the remote system.

36. The digital information appliance as described in claim 25, wherein the environmental influence includes at least one of a potentially harmful cold temperature and potentially harmful cold temperature trend, further comprising initiating a warming procedure so as to enable the digital information appliance to initiate the data saving routing without damaging the digital information appliance.

37. The digital information appliance as described in claim 25, wherein the environmental influence includes at least one of a potentially harmful cold temperature and potentially harmful cold temperature trend, protecting the digital information appliance includes initiating a warming procedure.

38. The digital information appliance as described in claim 37, wherein the detected temperature trend is determined by storing temperatures and ascertaining whether the stored temperatures indicate a potentially harmful trend.

39. The digital information appliance as described in claim 37, wherein the warming procedure includes warming at least a portion of the digital information appliance so as to be capable of transferring data without at least one of damaging the digital information appliance and corrupting the data.

40. The digital information appliance as described in claim 37, wherein the detected temperature is determined to be harmful by at least one of being less than and equal to a predetermined temperature.

41. The digital information appliance as described in claim 25, wherein the environmental influence includes movement, protecting the digital information appliance includes
detecting movement of the digital information appliance; and
determining if the movement is potentially harmful to the digital information appliance;
wherein the detected movement of the digital information appliance is determined to be potentially harmful, the digital information appliance responds to the potentially harmful movement.

42. The digital information appliance as described in claim 41, wherein the digital information appliance responds by issuing a warning.

43. The digital information appliance as described in claim 42, wherein the warning includes notifying a remote location of the potentially harmful environmental influence.

44. The digital information appliance as described in claim 43, wherein notifying includes placing a phone call to a predetermined number and playing a message notifying the remote location of the potentially harmful movement to the digital information appliance.

45. The digital information appliance as described in claim 41, wherein the potentially harmful movement is detected, the digital information appliance is capable of initiating a data saving routine.

46. The digital information appliance as described in claim 41, wherein the digital information appliance responds by placing at least one component included in the digital information appliance in a protected state so as to minimize damage to the component.

47. The digital information appliance as described in claim 46, wherein the component includes at least one of a hard drive, floppy drive and optical drive, positioning a read unit of the component so as not to damage at least one of the read unit and media.

48. The digital information appliance as described in claim 25, wherein an occurrence of an environmental influence is stored by a memory device.

49. The digital information appliance as described in claim 25, wherein protecting the digital information appliance corresponds to the type of environmental influence determined to be potentially harmful.

50. A digital information appliance capable of responding to a potentially harmful movement, the digital information appliance comprising:

a processor for executing a program of instructions on the digital information appliance;

a sensor coupled to the processor, the sensor capable of detecting movement; and a memory coupled to the processor for storing the program of instructions executable by at least one of said processor and said sensor wherein the program of instructions configures the digital information appliance to detect movement of the digital information appliance; and determine if the movement is potentially harmful to the digital information appliance;

wherein the detected movement of the digital information appliance is determined to be potentially harmful, the digital information appliance responds to the potentially harmful movement.

51. The digital information appliance as described in claim 50, wherein the sensor is capable of independent operation.

52. The digital information appliance as described in claim 50, wherein the digital information appliance responds by issuing a warning.

53. The digital information appliance as described in claim 52, wherein the warning includes notifying a remote location of the potentially harmful environmental influence.

54. The digital information appliance as described in claim 53, wherein notifying includes placing a phone call to a predetermined number and playing a message notifying the remote location of the potentially harmful movement of the digital information appliance.

55. The digital information appliance as described in claim 50, wherein the potentially harmful movement is detected, the digital information appliance is capable of initiating a data saving routine.

56. The digital information appliance as described in claim 50, wherein the digital information appliance responds by placing at least one component included in the digital information appliance in a protected state so as to minimize damage to the component.

57. The digital information appliance as described in claim 56, wherein the component includes at least one of a hard drive, floppy drive and optical drive, positioning a read unit of the component so as not to damage at least one of the read unit and media.

58. The digital information appliance as described in claim 50, wherein an occurrence of detected potentially harmful movement is stored by a memory device.

59. The digital information appliance as described in claim 58, wherein the occurrence is stored without activating the digital information appliance.

60. A method for protecting a digital information appliance from an environmental influence, comprising:

detecting an environment influence; and determining if the detected environmental influence is potentially harmful;

wherein the digital information appliance determines the environmental influence is potentially harmful, the digital information appliance is capable of protecting the digital information appliance by initiating a data saving routine wherein the data saving routine is capable of saving data contained in the digital information appliance so as to protect the data.

61. The method as described in claim 60, wherein the data saving routine includes transferring data to a remote system so as to protect the data.

62. The method as described in claim 61, where the data is transferred to the remote system over a network.

63. The method as described in claim 62, wherein the network is a wireless network, the digital information appliance includes a wireless modem to transfer the data to the remote system.

64. The method as described in claim 60, wherein the environmental influence includes at least one of a potentially harmful cold temperature and potentially harmful cold temperature trend, further comprising initiating a warming procedure so as to enable the digital information appliance to initiate the data saving routine without damaging the digital information appliance.

65. A method for protecting a digital information appliance from an environmental influence, comprising:

detecting an environment influence including at least one of a potentially harmful cold temperature and potentially harmful cold temperature trend; and determining if the detected environmental influence is potentially harmful;

wherein the digital information appliance determines the environmental influence is potentially harmful, the digital information appliance is capable of protecting the digital information appliance by initiating a warming procedure.

66. The method as described in claim 65, wherein the detected temperature trend is determined by storing temperature readings and ascertaining whether the stored temperature readings indicate a potentially harmful trend.

67. The method as described in claim 65, wherein the warming procedure includes warming at least a portion of the digital information appliance so as to be capable of transferring data without at least one of damaging the digital information appliance and corrupting the data.

68. The method as described in claim 65, wherein the detected temperature is determined to be harmful by at least one of being less than and equal to a predetermined temperature.

69. A method for protecting a digital information appliance from an environmental influence, comprising:

detecting an environment influence; and determining if the detected environmental influence is potentially harmful;

wherein the digital information appliance determines the environmental influence is potentially harmful, the digital information appliance is capable suspending operation of at least one component included in the information handling system that contributes to the environmental condition.

70. The method as described in claim 69, wherein the detected environmental influence is at least one of a potentially damaging temperature and a potentially damaging temperature trend, operation of a component in the digital information appliance that generates heat is suspended.

71. A method for protecting a digital information appliance from an environmental influence, comprising:

detecting an environment influence including at least one of barometric pressure, particulate matter and magnetic field; and determining if the detected environmental influence is potentially harmful;

wherein the digital information appliance determines the environmental influence is potentially harmful, the digital information appliance is capable of protecting the digital information appliance.

72. The method as described in claim 71, wherein the environmental influence is particulate matter, the digital information appliance responds by at least one of suspending operation of a component of the digital information appliance and suspending operation of the digital information appliance.

73. The method as described in claim 71, wherein the component includes a fan.

* * * * *